(12) United States Patent
Woo et al.

(10) Patent No.: US 9,470,935 B2
(45) Date of Patent: Oct. 18, 2016

(54) DISPLAY DEVICE WITH PIXEL ELECTRODE HAVING A SLIT DISPOSED AT AN ANGLE WITH RESPECT TO BRANCH ELECTRODE

(71) Applicant: Samsung Display Co., LTD., Yongin, Gyeonggi-Do (KR)

(72) Inventors: Su Wan Woo, Osan-si (KR); Chang Il Tae, Seoul (KR)

(73) Assignee: Samsung Display Co., Ltd., Giheung-Gu, Yongin-si, Gyeonggi-Do (KR)

( * ) Notice: Subject to any disclaimer, the term of this patent is extended or adjusted under 35 U.S.C. 154(b) by 0 days.

(21) Appl. No.: 14/635,700

(22) Filed: Mar. 2, 2015

(65) Prior Publication Data

US 2016/0077387 A1 Mar. 17, 2016

(30) Foreign Application Priority Data

Sep. 11, 2014 (KR) ........................ 10-2014-0120061

(51) Int. Cl.
*G02F 1/1343* (2006.01)
*G02F 1/1337* (2006.01)

(52) U.S. Cl.
CPC ..... *G02F 1/134309* (2013.01); *G02F 1/13439* (2013.01); *G02F 1/133711* (2013.01); *G02F 2001/133726* (2013.01); *G02F 2001/134345* (2013.01)

(58) Field of Classification Search
CPC .................. G02F 1/134309; G02F 1/133711; G02F 1/13439
See application file for complete search history.

(56) References Cited

U.S. PATENT DOCUMENTS

2012/0169955 A1 7/2012 Kim et al.
2013/0278878 A1 10/2013 Song et al.

FOREIGN PATENT DOCUMENTS

| KR | 20010035578 A | 5/2001 |
|---|---|---|
| KR | 1020070061993 A | 6/2007 |
| KR | 1020120089965 A | 8/2012 |

*Primary Examiner* — Joseph L Williams
(74) *Attorney, Agent, or Firm* — Robert E. Bushnell, Esq.

(57) ABSTRACT

A display device includes: a first substrate; a second substrate disposed to face the first substrate; a liquid crystal layer disposed between the first and second substrates; and a pixel electrode disposed on the first substrate and including a plurality of sub-pixel electrodes, wherein the sub-pixel electrode may include an outer electrode, a stem electrode extending in a direction substantially perpendicular to the outer electrode, and a plurality of branch electrodes extending in a predetermined direction from the outer electrode or the stem electrode, and wherein the sub-pixel electrode may be partitioned into first and second areas by the outer and stem electrodes and may include at least one slit disposed at a predetermined angle with respect to the branch electrode in the first area or the second area.

19 Claims, 14 Drawing Sheets

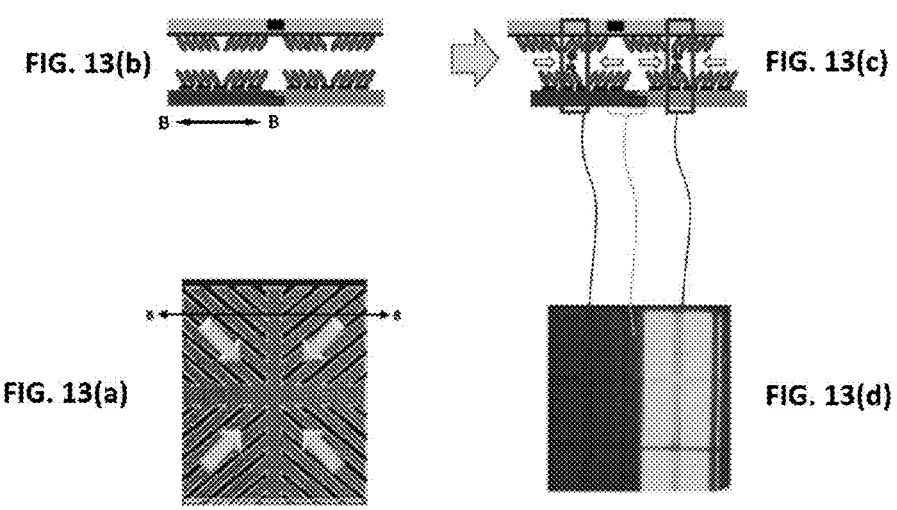

DISPLAY DEVICE WITH PIXEL ELECTRODE HAVING A SLIT DISPOSED AT AN ANGLE WITH RESPECT TO BRANCH ELECTRODE

CLAIM OF PRIORITY

This application claims the priority to and all the benefits accruing under 35 U.S.C. 119 of Korean Patent Application No. 10-2014-0120061, filed on Sep. 11, 2014, with the Korean Intellectual Property Office ("KIPO"), the disclosure of which is incorporated herein in its entirety by reference.

BACKGROUND OF THE INVENTION

1. Field of the Invention

Aspects of embodiments of the present invention relate to a display device improved in transmittance and aperture ratio.

2. Description of the Related Art

A liquid crystal display (LCD) may include two substrates having electrodes formed thereon and a liquid crystal layer interposed therebetween. Upon applying voltage to the electrodes, liquid crystal molecules of the liquid crystal layer are rearranged, thereby adjusting the amount of transmitted light.

Among LCDs, a vertically aligned mode LCD has been developed where the liquid crystal molecules are aligned so that a major axis thereof is aligned in a direction perpendicular to a display panel when an electric field is not generated. In order to achieve improved visibility in this vertically aligned mode LCD, a method of forming a multi domain has been suggested where one pixel is divided into a plurality of domains and liquid crystal molecules are inclined in different directions in each domain.

In recent years, with a demand for a stereoscopic display that intensifies a sense of immersion, studies on a curved display having a predetermined radius of curvature have been continuously conducted.

A conventional multi-domain pixel structure having four domains with an arrangement that two upper domains are positioned in an upper row and the remaining two lower domains are positioned below the upper domains (FIGS. 13a and 13b), however, has a problem of generating vertical line shadow defect (FIG. 13d) when the substrates of the pixel are horizontally misaligned and the liquid crystals in the misaligned region have opposite orientations (FIG. 13c). A conventional horizontal domain structure having four domains stacked in vertical direction (FIG. 14a) for resolving this horizontal misalignment situation, however, has a problem of generating shadow defect around the domain separation region 160 due to slit shortening and the horizontal components of the electric field may not be substantially horizontal with respect to the sides of the branch electrodes, causing misalignment of liquid crystals.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY OF THE INVENTION

Embodiments of the present invention are directed to a display device improved in transmittance and aperture ratio.

According to an embodiment of the present invention, a display device includes: a first substrate; a second substrate disposed to face the first substrate; a liquid crystal layer disposed between the first and second substrates; and a pixel electrode disposed on the first substrate and including a plurality of sub-pixel electrodes, wherein the sub-pixel electrode may include an outer electrode, a stem electrode extending in a direction substantially perpendicular to the outer electrode, and a plurality of branch electrodes extending in a predetermined direction from the outer electrode or the stem electrode, and wherein the sub-pixel electrode may be partitioned into first and second areas by the outer and stem electrodes and may include at least one slit disposed at a predetermined angle with respect to the branch electrode in the first area or the second area.

The first and second substrates may have a predetermined radius of curvature.

The outer electrode may have a quadrangular shape.

The branch electrode may include: a first branch electrode extending in a lower-right direction from the outer electrode; a second branch electrode extending in an upper-left direction from the outer electrode and the stem electrode; a third branch electrode extending in an upper-right direction from the outer electrode; and a fourth branch electrode extending in a lower-left direction from the outer electrode and the stem electrode.

The first and second branch electrodes may be disposed in the first area and the third and fourth branch electrodes are disposed in the second area.

The slit may include a first slit disposed in the first area and a second slit disposed in the second area.

The first slit or the second slit may be disposed at an angle of more than 0 and 90 or less degrees with respect to the branch electrode.

The first slit or the second slit may be disposed at 45 degrees with respect to the branch electrode.

The first and second slits may be symmetric to each other with respect to the stem electrode.

The first slit or the second slit may be disposed at an angle of more than 0 and less than 90 degrees with respect to the stem electrode.

The first and second areas of the sub-pixel electrode may have the same area.

The display device may further include: a first alignment layer on the first substrate; a common electrode on the second substrate; and a second alignment layer on the second substrate, wherein at least one of the first alignment layer, the second alignment layer, and the liquid crystal layer may include a photopolymer material.

The photopolymer material may include a reactive monomer or a reactive mesogen.

According to an embodiment of the present invention, a display device includes: a first substrate; a second substrate disposed to face the first substrate; a liquid crystal layer disposed between the first and second substrates; and a pixel electrode disposed on the first substrate and including a plurality of sub-pixel electrodes, wherein the sub-pixel electrode may include a stem slit partitioned into first and second areas, first and second stem electrodes that are symmetric to each other with respect to the stem slit, and a plurality of branch electrodes extending from the first stem electrode or the second stem electrode in a predetermined direction, and wherein the first stem electrode or the second stem electrode may be disposed at a predetermined angle with respect to the branch electrode.

The first and second substrates may have a predetermined radius of curvature.

The branch electrode may include: a first branch electrode extending in an upper-left direction from the first stem electrode; a second branch electrode extending in a lower-right direction from the first stem electrode; a third branch electrode extending in a lower-left direction from the second stem electrode; and a fourth branch electrode extending in an upper-right direction from the second stem electrode.

The first stem electrode or the second stem electrode may be disposed at an angle of more than 0 and 90 or less degrees with respect to the branch electrode.

The first stem electrode or the second stem electrode may be disposed at 45 degrees with respect to the branch electrode.

The first stem electrode or the second stem electrode may be disposed at an angle of more than 0 and less than 90 degrees with respect to the stem slit.

According to aspects of embodiments of the present invention, a display device may have improved transmittance and aperture ratio and may reduce a texture produced in a curved display.

The foregoing is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein:

FIG. 13a is a conventional four-domain pixel structure and the arrows indicating the general orientation of liquid crystals; FIG. 13b is a cross-sectional view of the pixel in FIG. 13a along B-B line; FIG. 13c is a cross-sectional view of the pixel of FIG. 13b with a horizontal misalignment between the upper and lower substrates; FIG. 13d is a plane view of the pixel in FIG. 13b with the misalignment.

DETAILED DESCRIPTION OF THE INVENTION

Figure 1:
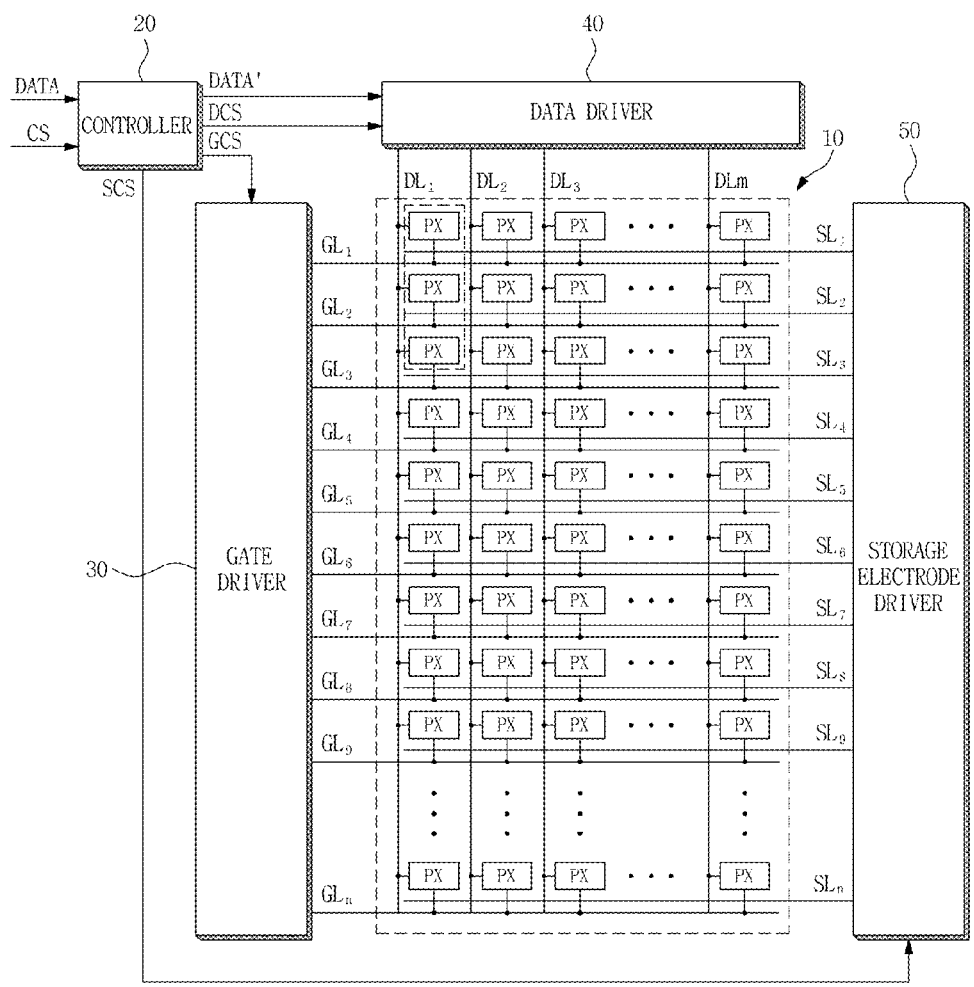
FIG. 1 is a block diagram illustrating a display device according to one embodiment of the present invention.

Advantages and features of the present invention and methods for achieving them will be made clear from embodiments described below in detail with reference to the accompanying drawings. The present invention may, however, be embodied in many different forms and should not be construed as being limited to the embodiments set forth herein. Rather, these embodiments are provided so that this disclosure will be thorough and complete, and will fully convey the scope of the invention to those skilled in the art. The present invention is merely defined by the scope of the claims. Therefore, well-known constituent elements, operations and techniques are not described in detail in the embodiments in order to prevent the present invention from being obscurely interpreted. Like reference numerals refer to like elements throughout the specification.

The spatially relative terms "below", "beneath", "lower", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Referring to FIG. 1, the display device according to one embodiment of the present invention may include a display panel 10 including a plurality of pixels PXs, a controller 20 configured to process an image signal DATA and a control signal CS supplied from the outside to output many different signals, a gate driver 30 configured to supply a gate signal to gate lines GL1~GLn connected to the pixels PXs, and a data driver 40 configured to supply a data signal to data lines DL1~DLm connected to the pixels PXs, and a storage electrode driver 50 configured to supply a storage electrode signal to storage electrode lines SL1~SLn.

The display panel 10 may include the plurality of gate lines GL1~GLn configured to supply the gate signal in a low direction, the plurality of data lines DL1~DLm configured to supply the data signal in a column direction, and the plurality of pixels PXs arranged in a matrix form connected to the gate and data lines.

The controller 20 may apply a gate control signal GCS to the gate driver 30 and a data control signal DCS to the data driver 40 based on the control signal CS supplied from the outside. Further, the controller 20 may output a processed image signal DATA' to the data driver 40 based on the image signal DATA supplied from the outside.

For example, the control signal CS may be a timing signal such as a vertical synchronization signal Vsync, a horizontal synchronization signal Hsync, a clock signal CLK, and a data enable signal DE. Further, the image signal DATA may be a digital signal representing a gray level of light emitted from the pixel PX.

The gate driver 30 may receive the gate control signal GCS from the controller 20 to generate the gate signal and supply the gate signal to the pixels PXs respectively connected to the plurality of gate lines GL1~GLn. As the gate signals are sequentially inputted to the pixel PXs, the data signals may be sequentially applied to the pixel PX.

The data driver 40 may receive the data control signal DCS and the processed image signal DATA' from the controller 20 and supply, in response to the data control signal DCS, the data signal corresponding to the processed image signal DATA' to the pixels PXs respectively connected to the plurality of data lines DL1~DLm. The data signal may also be expressed as a data voltage.

The storage electrode driver 50 is configured to receive the storage electrode control signal from the controller 20 to generate the storage electrode signal, and supply the storage electrode signal to the plurality of storage electrode lines SL1~SLn. The storage electrode signal may be expressed as a storage voltage.

Figure 2:
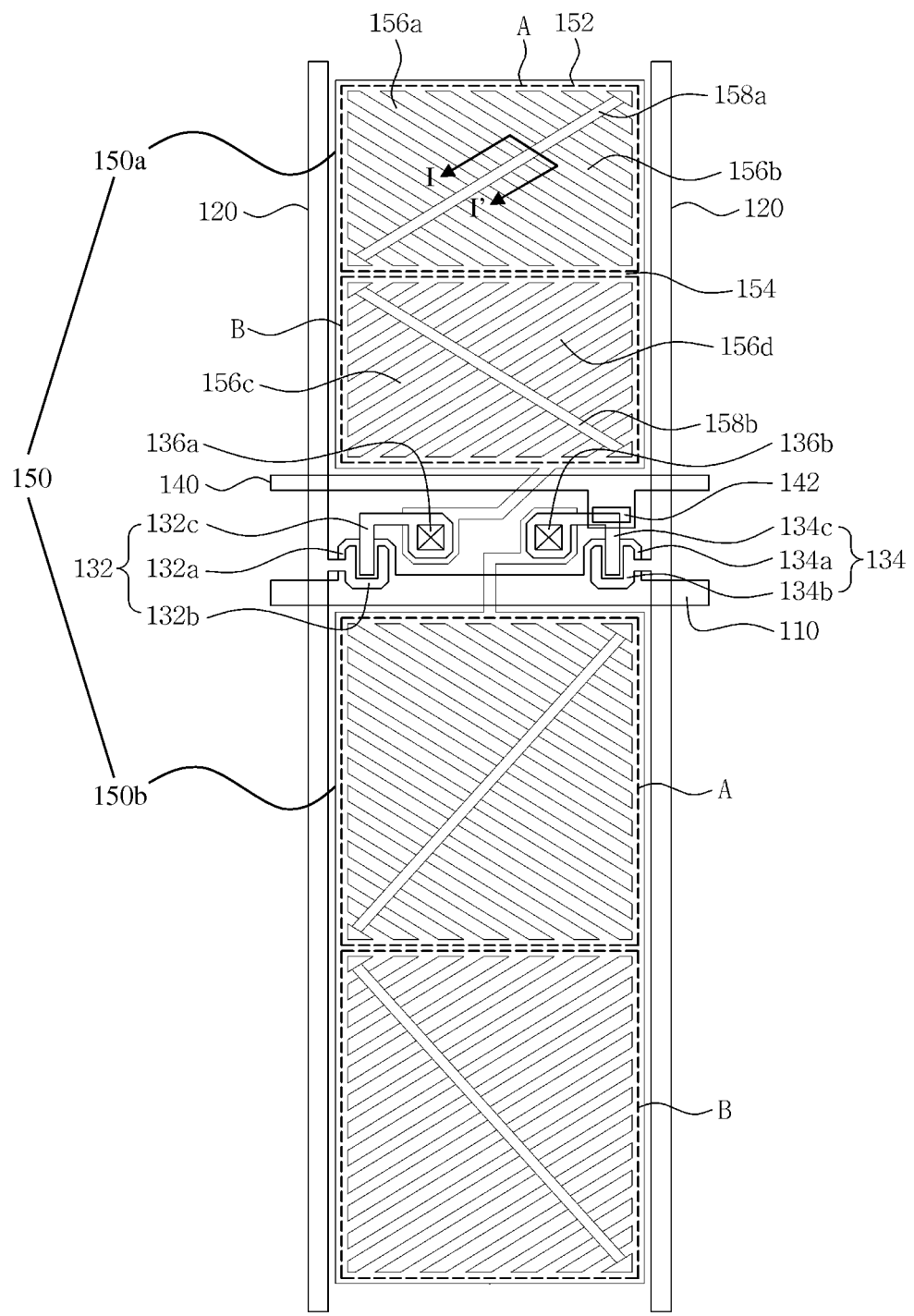
FIG. 2 is a plan view illustrating one pixel of the display device according to one embodiment of the present invention.
Figure 3:
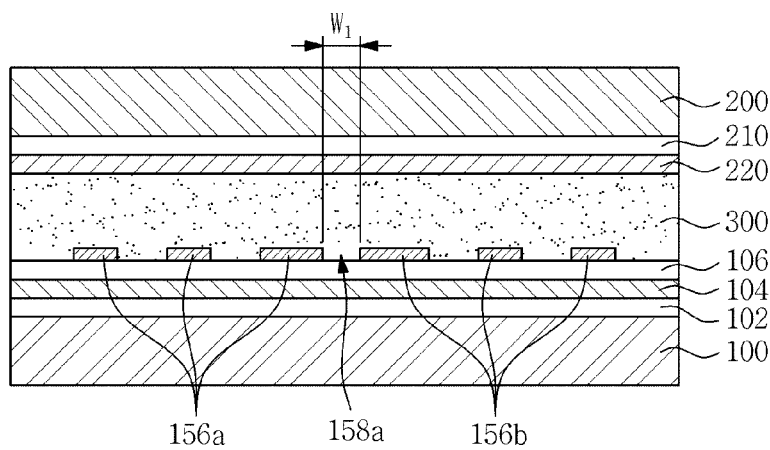
FIG. 3 is a cross-sectional view taken along line I-I' of FIG. 2.

Referring to FIGS. 2 and 3, the display device according to one embodiment of the present invention may include a first substrate 100, a second substrate 200 disposed to face the first substrate 100, and a liquid crystal layer 300 interposed between the first and second substrates 100 and 200.

Figure 11:
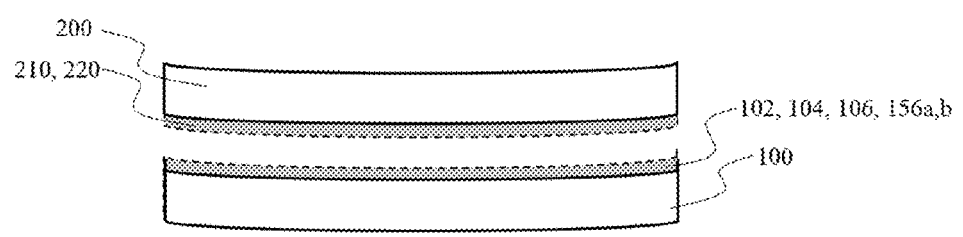
FIG. 11 is a cross-sectional view of the pixel shown in FIG. 2 having curved substrates having a predetermined radius of curvature.

The first substrate 100 may include a transparent material, such as glass or plastic, and may be a flat type or a curved type (FIG. 11) that has a predetermined radius of curvature.

The plurality of gate lines 110 may be disposed on the first substrate 100 and spaced apart from each other in a horizontal direction. The gate line 110 may be made of an aluminum-based metal such as aluminum (Al) or aluminum alloy, a silver-based metal such as silver (Ag) or silver alloy, a copper-based metal such as copper (Cu) or copper alloy, a molybdenum-based metal such as molybdenum (Mo) or molybdenum alloy, chromium (Cr), tantalum (Ta), titanium (Ti), and the like, but is not limited thereto. In some embodiments, the gate line 110 may have a multi-layer structure where at least two conductive layers having different physical properties are laminated.

The plurality of data lines 120 may be spaced apart from each other in a vertical direction to intersect the gate line 110. The data line 120 may be made of refractory metal, such as molybdenum, chromium, tantalum and titanium or a metal alloy thereof, but is not limited thereto. In some embodiments, the data line 120 may have a multi-layer structure including a refractory metal layer and a low-resistance conductive layer.

A first thin film transistor (TFT) 132 may include a first gate electrode 132a connected to the gate line 110, a first source electrode 132b connected to the data line 120, and a first drain electrode 132c connected to a first sub-pixel electrode 150a through a first contact hole 136a.

A second TFT 134 may include a second gate electrode 134a connected to the gate line 110, a second source electrode 134b connected to the data line 120, and a second drain electrode 134c connected to a second sub-pixel electrode 150b through a second contact hole 136b.

Although not illustrated, the gate electrodes 132a and 134a may be insulated from the source electrodes 132b and 134b and the drain electrodes 132c and 134c by a gate insulating layer 102. Further, a semiconductor layer (not illustrated) may be disposed between the source and drain electrodes 132b, 134b, 132c and 134c and the gate insulating layer 102.

A color filter 104 and a protective layer 106 may be sequentially disposed on the gate insulating layer 102 and the semiconductor layer, but is not limited thereto. In some embodiments, the color filter 104 may be disposed on the second substrate 200. The color filter 104 may display one of three primary colors of red, green, and blue, but is not limited thereto. In some embodiments, the color filter 104 may display one of cyan, magenta, yellow, and white colors. The protective layer 106 may be formed of inorganic insulating materials such as silicon nitrides or silicon oxides or organic insulating materials.

A storage electrode line 140 may be disposed in parallel with the gate line 110 and include a storage electrode 142 extending downwards. A predetermined voltage, such as a storage voltage Vcst, may be applied to the storage electrode line 140.

A pixel electrode 150 may be disposed on the protective layer 106 and formed of a transparent conductive material. The pixel electrode 150 may include the first and second sub-pixel electrodes 150a and 150b adjacently disposed in a column direction with respect to the gate line 110.

The first and second sub-pixel electrodes 150a and 150b will be described below with reference to FIG. 4.

An alignment layer (not illustrated) may be disposed on the pixel electrode 150. The alignment layer may be a vertical alignment layer or an alignment layer optically aligned using a photopolymer material. The photopolymer material may include a reactive monomer or a reactive mesogen.

Referring to FIG. 3, the second substrate 200 may be made of a transparent material, such as glass or plastic, and may be a flat type or a curved type (FIG. 11) having a radius of curvature corresponding to a flat panel or the first substrate 100.

A planarizing layer 210 and a common electrode 220 may be sequentially disposed on the second substrate 200. The planarizing layer 210 may be made of organic materials and the common electrode 220 may be made of a transparent conductive material.

The gate line 110, the data line 120, and a black matrix (not illustrated) configured to prevent light leakage along the TFTs 132 and 134 may be disposed under the planarization layer 210, but are not limited thereto. In some embodiments, the black matrix may be disposed on the first substrate 100.

An alignment layer (not illustrated) may be disposed under the common electrode 220. The alignment layer may be a vertical alignment layer or an alignment layer optically aligned using a photopolymer material. The photopolymer material may be a reactive monomer or a reactive mesogen.

Figure 4:
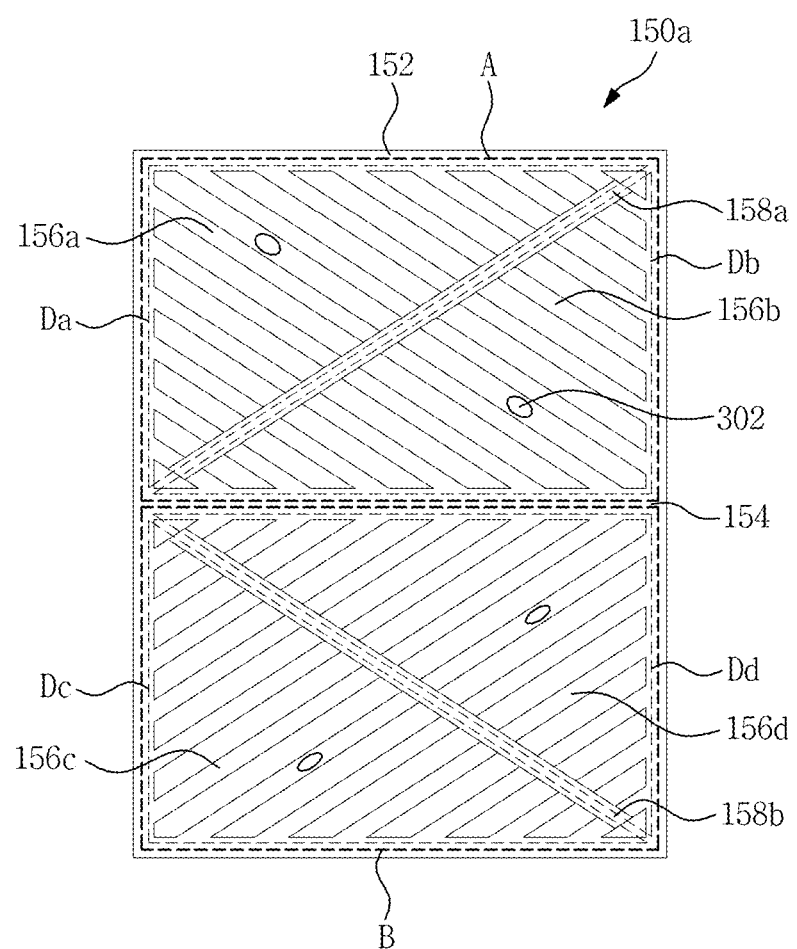
FIG. 4 is a plan view illustrating a fundamental structure of a first sub-pixel electrode of FIG. 2.

Referring to FIG. 4, the first sub-pixel electrode 150a may include an outer electrode 152, a stem electrode 154, and first to fourth branch electrodes 156a, 156b, 156c, and 156d extending from the outer or stem electrode 152 or 154.

The first sub-pixel electrode 150a may be partitioned into a first area A and a second area B by the outer and stem electrodes 152 and 154. The first area A may be partitioned into a first sub-area Da and a second sub-area Db by a first slit 158a. The second area B may be partitioned into a third sub-area Dc and a fourth sub-area Dd by a second slit 158b. In this case, it is preferable that the first and second slits 158a and 158b are symmetric to each other with respect to the stem electrode 154.

FIGS. 2 and 4 illustrate that the first and second slits are separated from the slit between the branch electrodes for ease of description, but the first and second slits may be integrally formed with the slit between the branch electrodes.

The outer electrode 152 may determine a shape of the sub-pixel electrode 150a and may have a quadrangular shape. It is preferable that the outer electrode 152 has a rectangular shape, but is not limited thereto. In some embodiments, the outer electrode 152 may have many different shapes such as a trapezoidal shape.

A transverse side of the outer electrode 152 may be disposed in parallel with the gate line 110 and a longitudinal side thereof may be disposed in parallel with the data line 120. In particular, the longitudinal side of the outer electrode 152 may prevent a capacitive coupling between the data line 120 and the first sub-pixel electrode 150a.

The stem electrode 154 may extend in a direction substantially perpendicular to the outer electrode 152 and disposed in the outer electrode 152 so that the first and second areas A and B can have the same area. According to one embodiment, the stem electrode 154 of the display device is depicted as extending in a direction substantially perpendicular to the longitudinal side of the outer electrode 152, but is not limited thereto. In some embodiments, the stem electrode 154 may extend in a direction substantially perpendicular to the transverse side of the outer electrode 152.

The first branch electrode 156a may extend in a lower-right direction from the outer electrode 152 and the second branch electrode 156b may extend in an upper-left direction from the outer electrode 152 and the stem electrode 154. The first and second branch electrodes 156a and 156b may be disposed in the first area A.

The third branch electrode 156c may extend in an upper-right direction from the outer electrode 152 and the fourth branch electrode 156d may extend in a lower-left direction from the outer electrode 152 and the stem electrode 154. The third and fourth branch electrodes 156c and 156d may be disposed in the second area B.

It is preferable that the first to fourth branch electrodes 156a, 156b, 156c, and 156d have the same width, but are not limited thereto. In some embodiments, the first to fourth branch electrodes 156a, 156b, 156c, and 156d may have different widths.

The first slit 158a may be disposed in the first area A and preferably between the first and second branch electrodes 156a and 156b. Therefore, the first branch electrode 156a may be disposed in the first sub area Da and the second branch electrode 156b may be disposed in the second sub area Db.

The second slit 158b may be disposed in the second area B and preferably between the third and fourth branch electrodes 156c and 156d. Therefore, the third branch electrode 156c may be disposed in the third sub area Dc and the fourth branch electrode 156d may be disposed in the fourth sub area Dd.

The first slit 158a or the second slit 158b may be respectively disposed at 45 degrees with respect to the first to fourth branch electrodes 156a, 156b, 156c, and 156d, but is not limited thereto. In some embodiments, the first slit or the second slit may be disposed at an angle of more than 0 and 90 or less degrees with respect to the branch electrode.

The first slit 158a or the second slit 158b may be disposed at 45 degrees with respect to the stem electrode 154, but is not limited thereto. In some embodiments, the first slit or the second slit may be disposed at an angle of more than 0 and less than 90 degrees with respect to the stem electrode according to the radius of curvature of the first and second substrates.

The first sub-pixel electrode 150a may receive a data voltage, which is the same as or different from that of the second sub-pixel electrode 150b, from the first drain electrode 132c through the first contact hole 136a. The data voltage applied to the first sub-pixel electrode 150a may form an electric field with a common voltage applied to the common electrode 200, thereby determining orientation of liquid crystal molecules 302. The orientation of the liquid crystal molecules 302 may determine luminance of light passing through the liquid crystal layer 300.

Sides of the first to fourth branch electrodes 156a, 156b, 156c, and 156d may cause electric field distortion to produce a horizontal component of the electric field, which determines an azimuthal direction of the liquid crystal molecules 302. The horizontal component of the electric field may be substantially horizontal with respect to the sides of the first to fourth branch electrodes 156a, 156b, 156c, and 156d. Therefore, the liquid crystal molecules 302 may be arranged in four different directions in the four sub areas Da to Dd of the first sub-pixel electrode 150a.

The second sub-pixel electrode 150b may be formed in the same manner as the first sub-pixel electrode 150a, and thus the detailed description of the second sub-pixel electrode 150b may be omitted. In some embodiments, the second sub-pixel electrode 150b may be different from the first sub-pixel electrode 150a in size. The scope of the present invention is not limited by the size of the first and second sub-pixel electrodes 150a and 150b.

Figure 5:
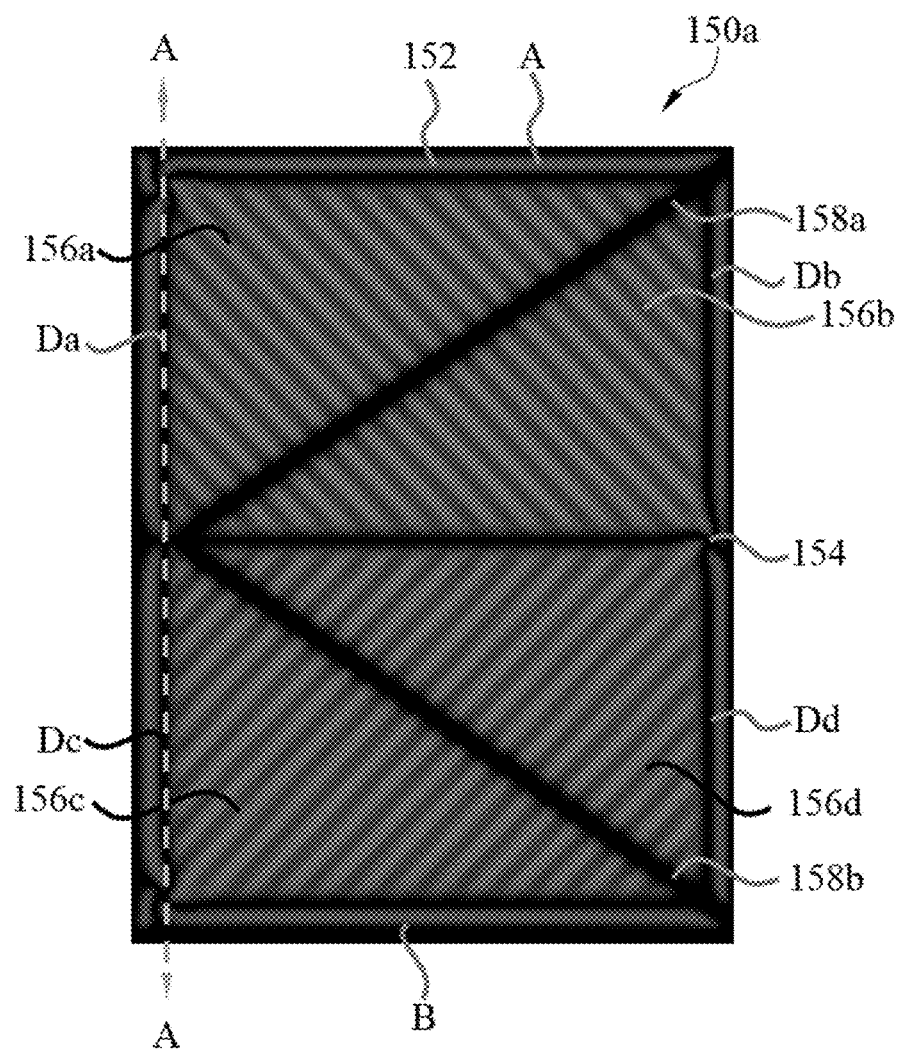
FIG. 5 is a picture illustrating an experiment result using the display device of FIG. 2.
Figure 12:
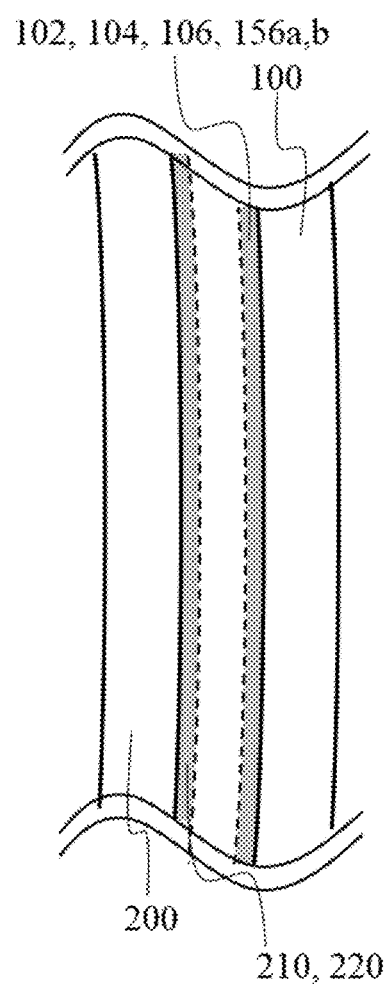
FIG. 12 is a cross-sectional view along A-A line of the pixel shown in FIG. 5 having curved substrates having a predetermined radius of curvature.
Figure 14A:
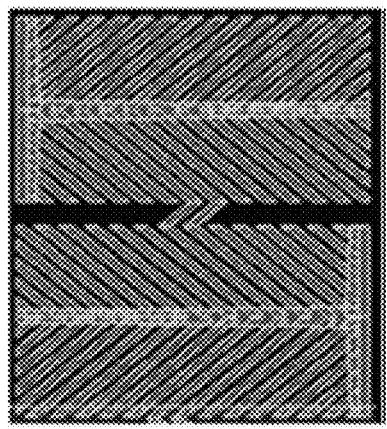
FIG. 14a is a conventional horizontal domain structure of pixel.
Figure 14B:
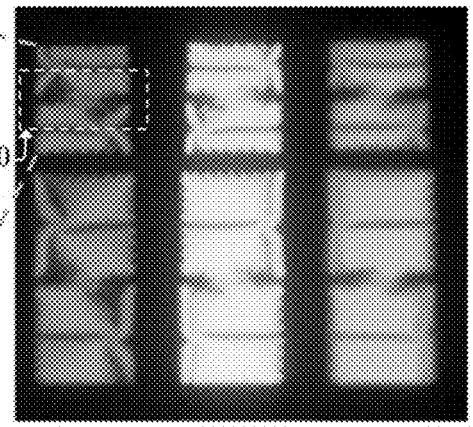
FIG. 14b is a plane view of the pixel of FIG. 14a having liquid crystal misalignment around a domain separation region 160.

Referring to FIG. 5, in the display device according to one embodiment of the present invention, the liquid crystal molecules may be aligned to have four domains in response to the electric field. Further, the display device according to one embodiment of the present invention may not produce texture in areas where the stem electrode and the first and second slits are formed, thereby providing high transmittance. FIG. 12 shows the pixel of FIG. 5 with curved substrates (100 and 200) while the regions on the substrates having other items are indicated by dash lines.

Figure 6:
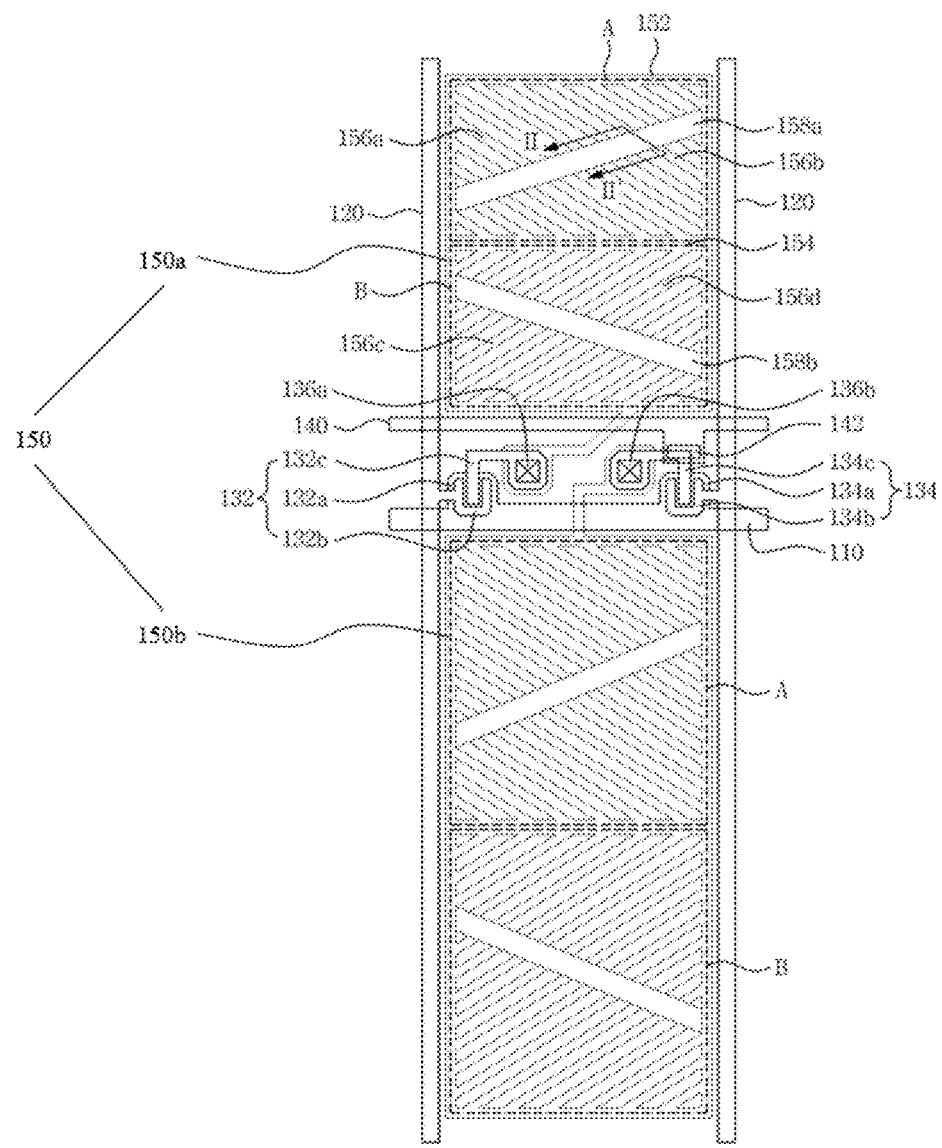
FIG. 6 is a plan view illustrating one pixel of a display device according to another embodiment of the present invention.
Figure 7:
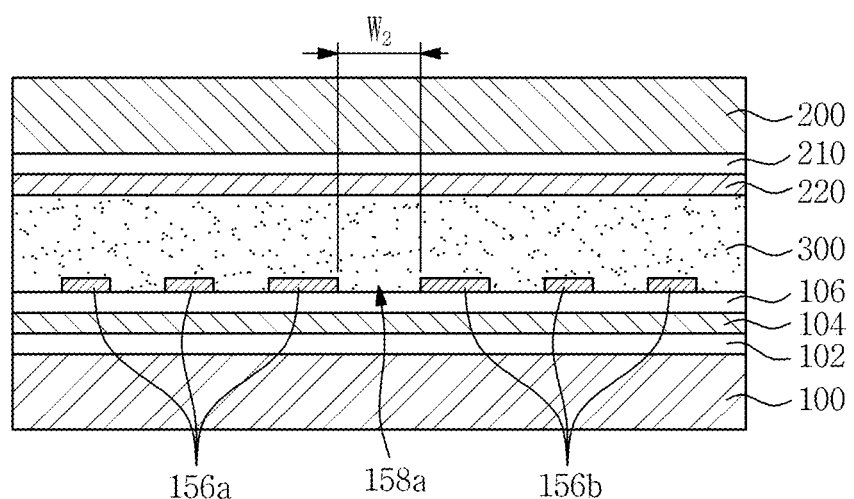
FIG. 7 is a cross-sectional view taken along line II-II' of FIG. 6.
Figure 8:
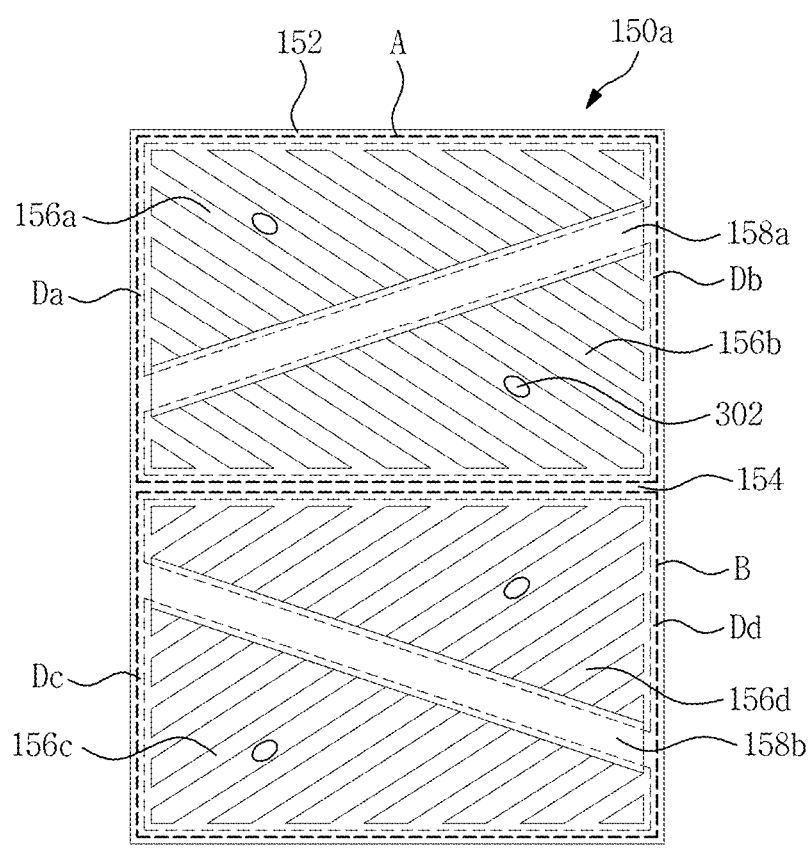
FIG. 8 is a plan view illustrating a fundamental structure of a first sub-pixel electrode of FIG. 6.

Referring to FIGS. 6 to 8, a display device according to another embodiment of the present invention may be identical to the display device illustrated in FIG. 2, except for shapes of first and second slits. Thus, repeated description will not be provided for brevity.

The first slit 158a or the second slit 158b may be respectively disposed at 45 degrees with respect to first to fourth branch electrodes 156a, 156b, 156c, and 156d, but is not limited thereto. In some embodiments, the first slit or the second slit may be disposed at an angle of more than 0 and 90 or less degrees with respect to the branch electrode.

The first slit 158a or the second slit 158b may be disposed at 20 degrees with respect to a stem electrode 154, but is not limited thereto. In some embodiments, the first slit or the second slit may be disposed at an angle of more than 0 and less than 90 degrees with respect to the stem electrode according to the radius of curvature of the first and second substrates.

A width W2 of the first slit 158a illustrated in FIG. 7 may be larger than a width W1 of the first slit 158a illustrated in FIG. 3, but is not limited thereto. In some embodiments, the width of the first slit may be properly adjusted according to the radii of curvature of the first and second substrates. In some embodiments, the second slit may be properly adjusted to have a width the same as or different from that of the first slit.

A first sub-pixel electrode 150a may be partitioned into first, second, third, and fourth sub areas Da, Db, Dc, and Dd having a trapezoid shape by an outer electrode 152, the stem electrode 154, and the first and second slits 158a and 158b. The first to fourth sub areas Da, Db, Dc, and Dd may respectively include the first to fourth branch electrodes 156a, 156b, 156c, and 156d.

Sides of the first to fourth branch electrodes 156a, 156b, 156c, and 156d may cause electric field deformation and produce a horizontal component of the electric field, which determines an azimuthal direction of liquid crystal molecules 302. The horizontal component of the electric field may be substantially horizontal with respect to the sides of the first to fourth branch electrodes 156a, 156b, 156c, and 156d. Therefore, the liquid crystal molecules 302 may be aligned in four different directions in the four sub areas Da to Dd of the first sub-pixel electrode 150a.

The second sub-pixel electrode 150b may be formed in the same manner as the first sub-pixel electrode 150a, and thus the detailed description of the second sub-pixel electrode 150b may be omitted. In some embodiments, the second sub-pixel electrode 150 may different from the first sub-pixel electrode 150a in size. A scope of the present invention is not limited by the size of the first and second sub-pixel electrodes 150a and 150b.

Figure 9:
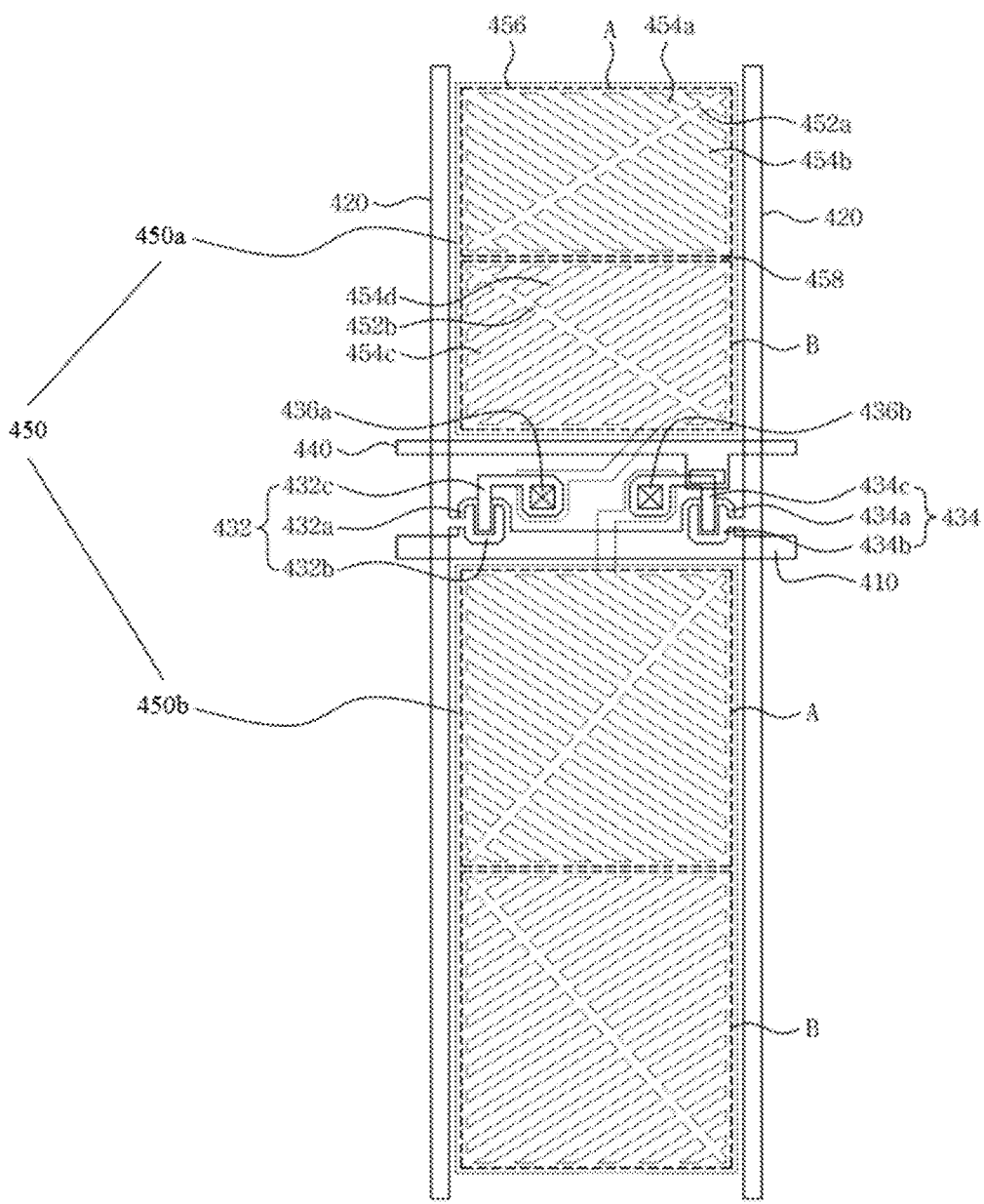
FIG. 9 is a plan view illustrating one pixel of a display device according to yet another embodiment of the present invention.
Figure 10:
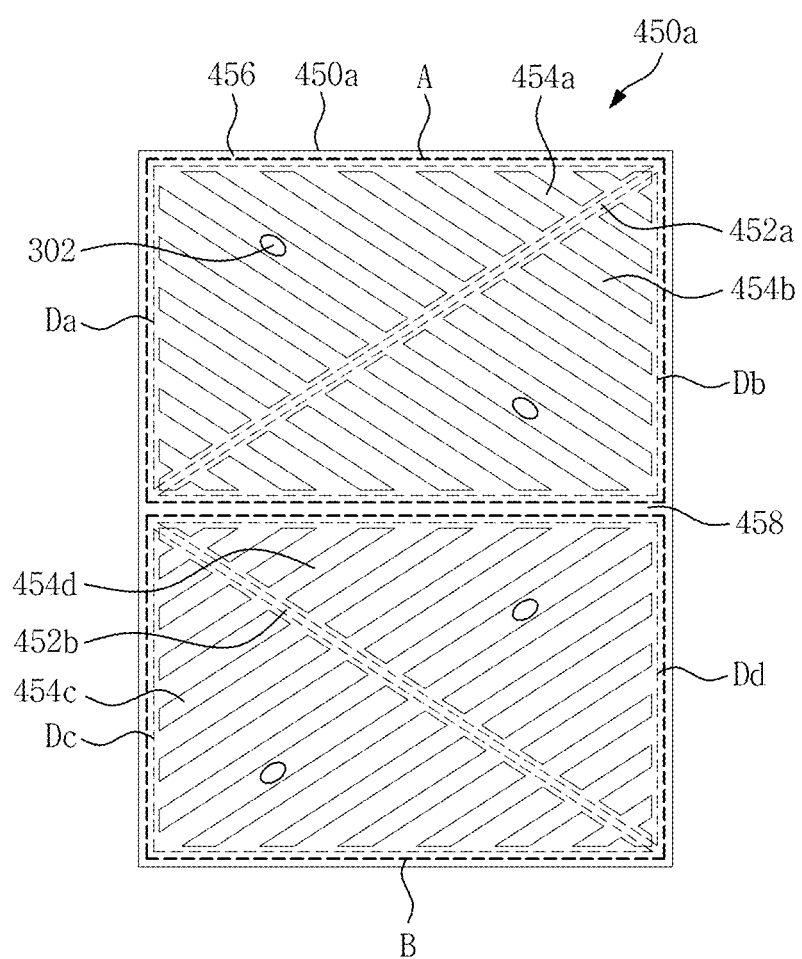
FIG. 10 is a plan view illustrating a fundamental structure of a first sub-pixel electrode of FIG. 9.

Referring to FIGS. 9 and 10, a display device according to yet another embodiment of the present invention may be identical to the display device illustrated in FIG. 2, except for a sub-pixel electrode. Therefore, repeated description will not be provided for brevity.

A pixel electrode 450 may include first and second sub-pixel electrodes 450a and 450b adjacently disposed in a column direction with respect to a gate line 410.

The first sub-pixel electrode 450a may include a first stem electrode 452a, a second stem electrode 452a, and first to fourth branch electrodes 454a, 454b, 454c, and 454d extending from the first stem electrode 452a or the second stem electrode 452b. Further, the first sub-pixel electrode 450a may be partitioned into a first area A and a second area B by an outer slit 456 and a stem slit 458.

The first and second stem electrodes 452a and 452b may be respectively disposed in the first and second areas A and B and symmetric to each other with respect to the stem slit 458.

The first branch electrode 454a may extend in an upper-left direction from the first stem electrode 452a and the second branch electrode 454b may extend in a lower-right direction from the first stem electrode 452a. The third branch electrode 454c may extend in a lower-left direction from the second stem electrode 452b and the fourth branch electrode 454d may extend in an upper-right direction from the second stem electrode 452b.

The first stem electrode 452a may be respectively disposed at 45 degrees with respect to the first and second branch electrodes 454a and 454b. The second stem electrode 452b may be respectively disposed at 45 degrees with respect to the third and fourth branch electrodes 454c and 454d. However, embodiment of the present invention may not be limited thereto. In some embodiments, the first stem electrode or the second stem electrode may be disposed at an angle of more than 0 and 90 or less degrees with respect to the branch electrode.

The first stem electrode 452a or the second stem electrode 452b may be disposed at 45 degrees with respect to the stem slit 458, but is not limited thereto. In some embodiments, the first stem electrode or the second stem electrode may be disposed at an angle of more than 0 and less than 90 degrees with respect to the stem slit.

Sides of the first to fourth branch electrodes 454a, 454b, 454c, and 454d may cause electric field distortion and produce a horizontal component of the electric field, which determines an azimuthal direction of liquid crystal molecules 302. The horizontal component of the electric field may be substantially horizontal with respect to the sides of the first to fourth branch electrodes 454a, 454b, 454c, and 454d. Accordingly, the liquid crystal molecules 302 may be aligned in four different directions in the four sub areas Da to Dd of the first sub-pixel electrode 450a.

The second sub-pixel electrode 450b may be formed in the same manner as the first sub-pixel electrode 450a, and thus the detailed description of the second sub-pixel electrode 450b may be omitted. However, the second sub-pixel electrode 450b may be different from the first sub-pixel electrode 450a in size. A scope of the present invention is not limited to the size of the first and second sub-pixel electrodes 450a and 450b.

From the foregoing, it will be appreciated that various embodiments in accordance with the present disclosure have been described herein for purposes of illustration, and that various modifications may be made without departing from the scope and spirit of the present teachings. Accordingly, the various embodiments disclosed herein are not intended to be limiting of the true scope and spirit of the present teachings.

What is claimed is:

1. A display device comprising:
a first substrate;
a second substrate disposed to face the first substrate;
a liquid crystal layer disposed between the first and second substrates; and
a pixel electrode disposed on the first substrate and comprising a plurality of sub-pixel electrodes,
wherein the sub-pixel electrode comprises an outer electrode, a stem electrode extending in a direction substantially perpendicular to the outer electrode, and a plurality of branch electrodes extending in a predetermined direction from the outer electrode or the stem electrode, and
wherein the sub-pixel electrode is partitioned into first and second areas by the outer and stem electrodes and comprises at least one slit disposed at a predetermined angle with respect to the branch electrode in the first area or the second area.

2. The display device of claim 1, wherein the first and second substrates have a predetermined radius of curvature.

3. The display device of claim 1, wherein the outer electrode has a quadrangular shape.

4. The display device of claim 1, wherein the branch electrode comprises:
- a first branch electrode extending in a lower-right direction from the outer electrode;
- a second branch electrode extending in an upper-left direction from the outer electrode and the stem electrode;
- a third branch electrode extending in an upper-right direction from the outer electrode; and
- a fourth branch electrode extending in a lower-left direction from the outer electrode and the stem electrode.

5. The display device of claim 4, wherein the first and second branch electrodes are disposed in the first area and the third and fourth branch electrodes are disposed in the second area.

6. The display device of claim 1, wherein the slit comprises a first slit disposed in the first area and a second slit disposed in the second area.

7. The display device of claim 6, wherein the first slit or the second slit is disposed at an angle of more than 0 and 90 or less degrees with respect to the branch electrode.

8. The display device of claim 7, wherein the first slit or the second slit is disposed at 45 degrees with respect to the branch electrode.

9. The display device of claim 6, wherein the first and second slits are symmetric to each other with respect to the stem electrode.

10. The display device of claim 9, wherein the first slit or the second slit is disposed at an angle of more than 0 and less than 90 degrees with respect to the stem electrode.

11. The display device of claim 1, wherein the first and second areas of the sub-pixel electrode have the same area.

12. The display device of claim 1, further comprising:
- a first alignment layer on the first substrate;
- a common electrode on the second substrate; and
- a second alignment layer on the second substrate,
- wherein at least one of the first alignment layer, the second alignment layer, and the liquid crystal layer comprises a photopolymer material.

13. The display device of claim 12, wherein the photopolymer material comprises a reactive monomer or a reactive mesogen.

14. A display device comprising:
- a first substrate;
- a second substrate disposed to face the first substrate;
- a liquid crystal layer disposed between the first and second substrates; and
- a pixel electrode disposed on the first substrate and comprising a plurality of sub-pixel electrodes,
- wherein the sub-pixel electrode comprises a stem slit partitioned into first and second areas, first and second stem electrodes that are symmetric to each other with respect to the stem slit, and a plurality of branch electrodes extending from the first stem electrode or the second stem electrode in a predetermined direction, and
- wherein the first stem electrode or the second stem electrode is disposed at a predetermined angle with respect to the branch electrode.

15. The display device of claim 14, wherein the first and second substrates have a predetermined radius of curvature.

16. The display device of claim 14, wherein the branch electrode comprises:
- a first branch electrode extending in an upper-left direction from the first stem electrode;
- a second branch electrode extending in a lower-right direction from the first stem electrode;
- a third branch electrode extending in a lower-left direction from the second stem electrode; and
- a fourth branch electrode extending in an upper-right direction from the second stem electrode.

17. The display device of claim 14, wherein the first stem electrode or the second stem electrode is disposed at an angle of more than 0 and 90 or less degrees with respect to the branch electrode.

18. The display device of claim 17, wherein the first stem electrode or the second stem electrode is disposed at 45 degrees with respect to the branch electrode.

19. The display device of claim 14, wherein the first stem electrode or the second stem electrode is disposed at an angle of more than 0 and less than 90 degrees with respect to the stem slit.

* * * * *